Aug. 11, 1936.     B. J. FERREYRO ET AL     2,050,488
PLOW
Filed Oct. 18, 1934
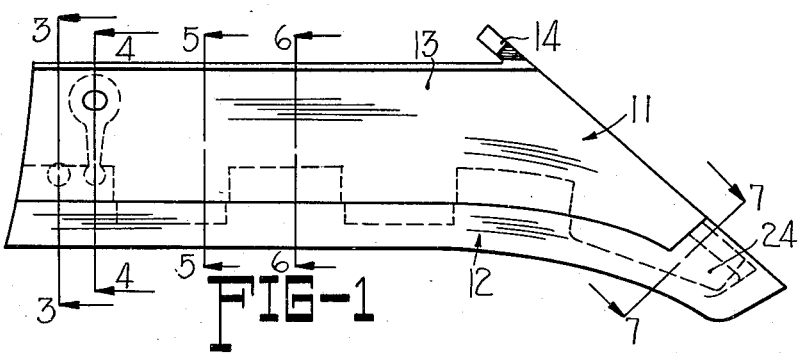
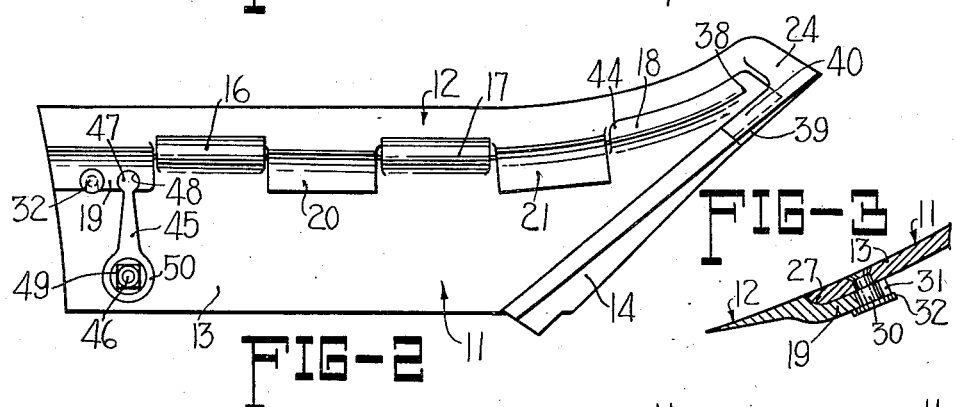
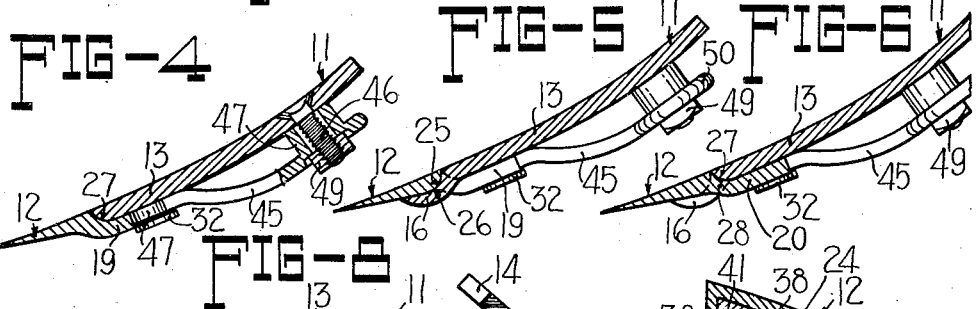
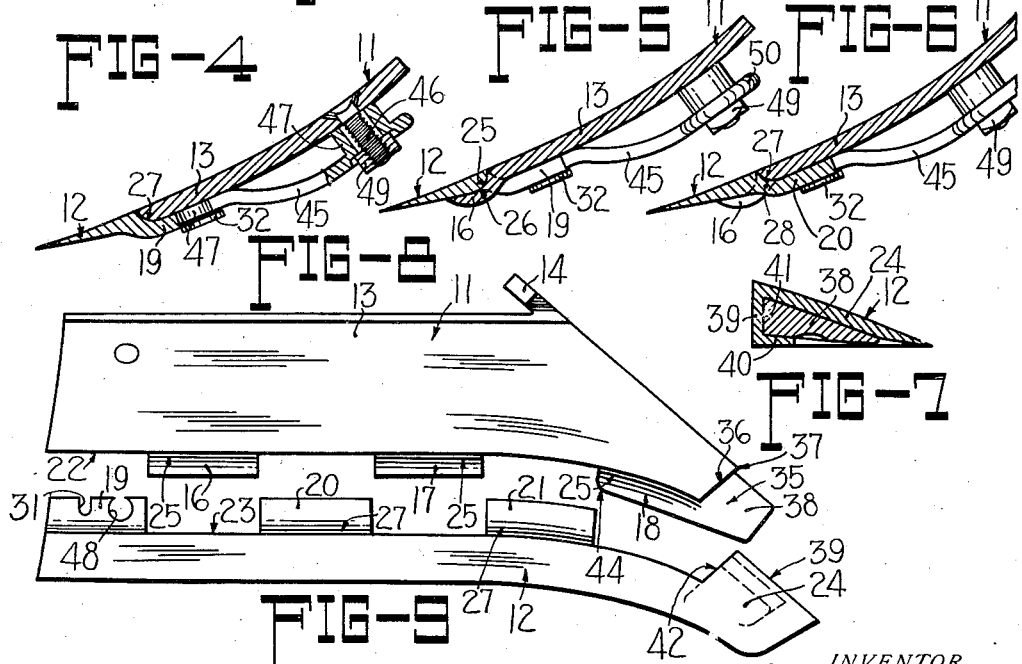
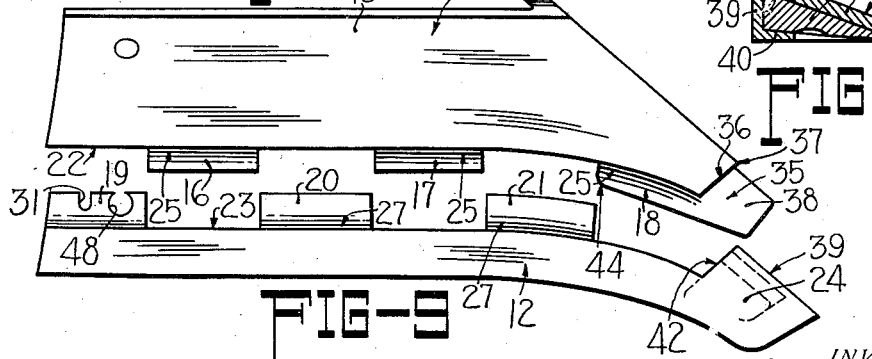
INVENTOR
Benito Jose Ferreyro
Juan Cayetano Bartolome Pesce
by R C Bopf ATTORNEY Patented Aug. 11, 1936

2,050,488

UNITED STATES PATENT OFFICE 2,050,488

PLOW

Benito Jose Ferreyro, Isidro Casanovas, and Juan Cayetano Bartolome Pesce, Buenos Aires, Argentina, assignors to Deere & Company, Moline, Ill., a corporation of Illinois Application October 18, 1934, Serial No. 748,832
In Argentina November 18, 1933

5 Claims. (Cl. 97—125)

This invention relates in general to plows and more particularly to a plow bottom having a detachable cutting edge.

The conventional form of plow bottom comprises a frog to which is separately attached a moldboard and a share. As the cutting edge of the share is subject to wear, it has been customary to attach the share to the frog of the plow bottom by means of bolts or other quick detachable means so that the share may be removed from the plow bottom for resharpening or replacement. Inasmuch as it is only the cutting edge of the share itself which is subject to any appreciable wear, it has been proposed to provide a detachable edge for the share so that the share may be left permanently attached to the plow bottom, and so that only the edge need be replaced when worn beyond the point of usefulness.

The object of our invention is the provision of a sectional share comprising a body portion and a detachable edge portion provided with improved interlocking means whereby the detachable edge portion will be securely held in position but may readily be detached from the body portion for the purpose of resharpening it or replacing it with a new edge.

Another object of our invention is the provision of a sectional share in which the interlocking devices on the body portion of the share and on the detachable edge portion are disposed on the lower side of the detachable edge and the body of the share so that the upper side of the detachable edge and of the body of the share define a smooth continuous surface without any interruption therein upon which soil may collect and interfere with proper scouring of the plow bottom.

A preferred embodiment of our invention is shown and described in the following specification in connection with the accompanying drawing in which:

Figure 1 is a plan view of our improved plow-share with the detachable edge attached to the share body;

Figure 2 is an inverted view of our improved share with the detachable edge attached to the share body;

Figures 3, 4, 5, 6 and 7 are enlarged sectional views along the lines 3—3, 4—4, 5—5, 6—6 and 7—7 of Figure 1, respectively;

Figure 8 is a plan view of the share body without the detachable edge attached thereto; and, Figure 9 is a plan view of the detachable edge.

A conventional plowshare comprises a laterally extending blade portion having a forwardly projecting point at one side and a vertically disposed landside portion extending along one side and converging with the point of the blade. The rear portion of the share is shaped to engage the lower edge of the moldboard of the plow bottom and the under side of the share is usually provided with suitable fastening means by which the share is fastened to the frog of the plow bottom. The shape of our improved share as a whole may be similar to that of the conventional share and it may be provided with any suitable fastening means by which it is fastened to the frog of a plow bottom. However, the shape of the share in general and the means by which the share is fastened to the frog of a plow bottom form no part of our invention.

Our improved share comprises two sections, a body portion 11 and a detachable edge portion 12. The body portion 11 consists of a blade 13 and a landside 14. The detachable edge 12 is held in position on the body portion of the share by means including a series of interengaging laterally spaced projections 16, 17 and 18 on the body of the share and laterally spaced projections 19, 20 and 21 on the detachable edge. Projections 19, 20 and 21 on the detachable edge are staggered with respect to projections 16, 17 and 18 on the share body to be received in the spaces between projections 16, 17 and 18. Projections 16, 17 and 18 extend downwardly and forwardly from the forward margin 22 of the blade 13 of the share body to engage with the lower side of the detachable edge; and the projections 19, 20 and 21 extend downwardly and rearwardly from the rear margin 23 of the detachable edge to engage with the lower side of the blade 13 of the share body. The portion of the margin 23 of the detachable edge between projections 19, 20 and 21 as well as that portion between projection 21 and the point 24 of the detachable edge is curved downwardly and forwardly, as shown at 25, to properly fit the upper curved surface 26 of the downwardly and forwardly extending projections 16, 17 and 18. Similarly, that portion of the forward margin 22 of the blade of the share body between projections 16, 17 and 18 and also that portion between projection 16 and the end of the blade 13 is curved downwardly and rearwardly, as shown at 27, to properly fit the upper curved surface 28 of the downwardly and rearwardly extending projections 19, 20 and 21. This interlocking connection between the detachable edge and the body of the share effectively prevents any downward movement of the detachable edge relative to the body of the share.

To effectively hold the detachable edge against upward displacement relative to the body of the share, we have provided retaining means in the form of a lug 30 on the lower side of the blade 13 of the body of the share near the outer end thereof which is adapted to engage in a slot 31 formed in the rear edge of the projection 19. Lug 30 is provided with an enlarged head 32 which engages the lower surface of projection 19.

The point of the body of the share is provided with a reduced extension 35 forming an abutting shoulder 36 at the forward end of the blade 13, and a shoulder 37 at the forward end of the landside 14. The projection 18 extends toward the point of the body of the share and meets the reduced extension 35, and together therewith forms a forwardly extending tongue 38. The point of the detachable edge 24 is provided with a short section of landside 39, the lower edge of which is turned inwardly as shown at 40 to form a pocket 41 for the reception of the tongue 38. The rear edge 42 of the point and the rear edge of the landside section 39 of the detachable edge are adapted to abut the shoulders 36 and 37 when the detachable edge is in position. This interlocking connection of the point of the detachable edge with the tongue 38 of the body of the share together with the lug 30 engaging in slot 31 effectively prevents any upward movement of the detachable edge relative to the body of the share.

To place the detachable share on the body portion, the point 24 is first placed over the tongue 38 until the rear edge of the landside portion 39 is in contact with the shoulder 37. Then the detachable edge is pivoted with respect to the body of the share about the shoulder 37 to bring the rear margin 23 of the detachable edge in engagement with the forward margin 22 of the body of the share. The rear edge of projection 18 is rounded somewhat, as shown at 44, and the tongue 38 fits with sufficient looseness in the pocket 41 to permit swinging of the detachable edge into position as described.

To lock the detachable edge to the share body, we have further provided an arm 45 mounted upon a bolt 46 carried by the body portion of the share, which arm is provided with an enlarged rounded head 47 adapted to engage in a similarly shaped recess 48 provided in the projection 19. Tightening the nut 49 on bolt 46 locks the head 47 of the arm 45 down against the body of the share in the recess 48. This prevents the detachable edge from being withdrawn from the body portion. Preferably we make the arm 45 as an integral part of the abutment 50 which constitutes one of the attaching members by which the body portion of the share is attached to the frog (not shown) of the plow bottom.

From the foregoing it will be seen that we have provided a detachable edge for a plowshare in which all the interlocking devices by which the edge is held in position upon the body of the share are disposed below the upper surface of the edge and the blade of the share so that the upper surface of the edge and the blade of the share define a continuous, smooth surface. By reason of the interengaging projections on the body of the share engaging the under side of the detachable edge and the projections on the detachable edge engaging the under side of the body of the share, the full thickness of both of these elements is retained. This makes not only for a strong interconnection between the two elements, but also increases the length of life of the detachable edge as well as of the share as a whole. Of course, if desired, depressions could be formed on the under side of each portion to receive the projections on the other portion. In our new sectional share the detachable edge is rigidly and securely held in position when attached to the share body, but may readily be removed by merely loosening the one nut 49 and lifting the head 47 of arm 45 out of the recess 48.

While we have illustrated our invention in connection with a share which is assumed to be detachably connected to the frog of the plow bottom, it is readily understood that inasmuch as the body of the share now need no longer be detached but can be left permanently connected with the frog, the need for making the share as a whole easily detachable from the frog no longer exists. Therefore, the moldboard and the body portion of the share can, if desired, be made in one continuous piece. For this reason the term "share" as used in the appended claims is intended to be interpreted broadly enough to include a structure in which the share and moldboard of the plow bottom are made in one continuous piece as well as a structure in which the share is made as a separate element separately attached to the frog of the plow bottom.

What we claim is:—

1. A sectional share for a plow bottom comprising a body portion and a detachable edge portion, and means for detachably connecting said edge portion to said body portion with the rear margin of said edge portion in juxtaposition with the forward margin of said body portion comprising a projection extending forwardly from the forward margin of said body portion and engaging the under side of said edge portion, and a projection extending rearwardly from the rear margin of said edge portion and engaging the under side of said body portion, said projections holding the detachable edge portion against downward movement relative to the body portion, a lug on the lower side of said body portion engaging in a slot in said rearwardly extending projection and having a head engaging the lower face of said rearwardly extending projection for holding the outer end of the detachable edge portion against upward movement relative to the body portion, the detachable edge portion having a forwardly projecting point having a pocket formed therein opening to the rear, and a forwardly projecting tongue on the body portion adapted to be received in said pocket for holding the point of the detachable edge portion against upward movement relative to the body portion.

2. A sectional share for a plow bottom comprising a body portion and a detachable edge portion, and means for detachably connecting said edge portion to said body portion with the rear margin of said edge portion in juxtaposition with the forward margin of said body portion comprising a projection extending forwardly from the forward margin of said body portion and engaging the under side of said edge portion, and a projection extending rearwardly from the rear margin of said edge portion and engaging the under side of said body portion, said projections holding the detachable edge portion against downward movement relative to the body portion, a lug on the lower side of said body portion engaging in a slot in said rearwardly extending projection for holding the outer end of the detachable edge portion against upward movement relative to the body portion, the detachable edge portion having a forwardly projecting point having a pocket formed therein opening to the rear, a forwardly projecting tongue on the body portion adapted to be received in said pocket for holding the point of the detachable edge portion against upward movement relative to the body portion and means carried by one of said portions and cooperating with means on the other of said portions for holding said edge portions against forward displacement relative to said body portion.

3. A sectional share for a plow bottom comprising a body portion and a detachable edge portion, and means for detachably connecting said edge portion to said body portion with the rear margin of said edge portion in juxtaposition with the forward margin of said body portion comprising a projection extending forwardly from the forward margin of said body portion and engaging the under side of said edge portion, and a projection extending rearwardly from the rear margin of said edge portion and engaging the under side of said body portion, said projections holding the detachable edge portion against downward movement relative to the body portion, the detachable edge portion having a forwardly projecting point having a pocket formed therein opening to the rear, a forwardly projecting tongue on the body portion adapted to be received in said pocket for holding the point of the detachable edge against upward movement and forward displacement relative to the body portion, a lug on the lower side of said body portion engaging in a slot in said rearwardly extending projection for holding the outer end of the detachable edge portion against upward movement relative to the body portion, and an arm pivoted to the under side of said body portion having an enlarged head at its free end adapted to engage in a similarly shaped recess in said rearwardly extending projection for holding the outer end of said detachable edge against forward displacement relative to said body portion.

4. A sectional share for a plow bottom comprising a body portion and a detachable edge portion, the body portion having a downwardly and rearwardly curved forward margin and at least two projections extending forwardly therefrom and adapted to engage the under side of the detachable edge portion and having a curved upper surface, and the detachable edge portion having a downwardly and forwardly curved rear margin complementary to the curved upper surface of the projections on the body portion, and at least one projection extending rearwardly from said rear margin and disposed between the projections on the body portion and adapted to engage the under side of the body portion, said projection on the detachable edge portion having an upper curved surface complementary to the forward margin of the body portion, and disconnectible means for holding the detachable edge portion against forward displacement relative to the body portion.

5. A sectional share for a plow bottom comprising a body portion and a detachable edge portion, the body portion comprising a blade and a landside, the body portion having at least two forwardly extending projections adapted to engage the under side of the detachable edge portion, the detachable edge portion having at least one rearwardly extending projection disposed between the projections on the body portion, the detachable edge portion having a point provided with a short section of landside, the lower edge of which is turned inwardly to form a pocket, and a forwardly projecting tongue of triangular cross-section on the body portion adapted to be received in said pocket with sufficient looseness to permit swinging movement of the detachable edge relative to the body portion during initial positioning of the detachable edge on said body portion.

BENITO JOSE FERREYRO.
JUAN CAYETANO BARTOLOME PESCE.